US012566282B2

(12) United States Patent
Chen et al.

(10) Patent No.: US 12,566,282 B2
(45) Date of Patent: Mar. 3, 2026

(54) LIQUID LENS CONTROLLED BY INTERDIGITAL ELECTRODE MADE OF TWO INSULATED WIRES

(71) Applicant: Nanjing University of Posts and Telecommunications, Nanjing (CN)

(72) Inventors: Tao Chen, Nanjing (CN); Qingyu Hu, Nanjing (CN); Xiuting Shang, Nanjing (CN); Jingyi Sun, Nanjing (CN); Lingcheng Gu, Nanjing (CN); Ke Ding, Nanjing (CN); Huibin Liu, Nanjing (CN); Xiaoyu Zhang, Nanjing (CN); Rongqing Xu, Nanjing (CN)

(73) Assignee: Nanjing University of Posts and Telecommunications, Nanjing (CN)

( * ) Notice: Subject to any disclaimer, the term of this patent is extended or adjusted under 35 U.S.C. 154(b) by 303 days.

(21) Appl. No.: 18/410,948

(22) Filed: Jan. 11, 2024

(65) Prior Publication Data

US 2025/0044486 A1     Feb. 6, 2025

(30) Foreign Application Priority Data

Aug. 2, 2023     (CN) .......................... 202310963914.7

(51) Int. Cl.
*G02B 3/14* (2006.01)
*G02F 1/29* (2006.01)

(52) U.S. Cl.
CPC .............. *G02B 3/14* (2013.01); *G02F 1/294* (2021.01)

(58) Field of Classification Search
CPC .......... G02B 3/14; G02B 26/004; G02F 1/294
See application file for complete search history.

(56) References Cited

U.S. PATENT DOCUMENTS

2021/0208387 A1 *  7/2021  Karam ..................... G03B 5/00

* cited by examiner

*Primary Examiner* — Charles S Chang
(74) *Attorney, Agent, or Firm* — Hemisphere Law, PLLC

(57) ABSTRACT

A liquid lens controlled by an interdigital electrode made of two insulated wires includes an inner core cavity body, the two insulated wires, a first transparent body, a second transparent body, a first fluid, and a second fluid. The insulated wires are arranged side by side and longitudinally winded on the inner core cavity body; the insulated wires are configured to form an interdigital electrode on a sidewall of the inner core cavity body; the first transparent body is disposed at an upper end of the inner core cavity body and the second transparent body is disposed at a lower end of the inner core cavity body; a lens cavity is defined among the inner core cavity body, the first transparent body, and the second transparent body; the first fluid and the second fluid are immiscible, and disposed in the lens cavity.

8 Claims, 4 Drawing Sheets

LIQUID LENS CONTROLLED BY INTERDIGITAL ELECTRODE MADE OF TWO INSULATED WIRES

TECHNICAL FIELD

The disclosure relates to technical fields of photoelectric imaging, photoelectric sensing, and optical information processing devices, and specifically to a liquid lens controlled by an interdigital electrode made of two insulated wires.

BACKGROUND

With the development of technology, patterned electrodes as the best construction scheme of non-uniform electric field are often prepared by depositing and etching conductive materials on inner surfaces of devices. On the basis of patterned electrodes, there are related researches to construct interdigital electrodes. Specifically, a conductive material such as indium tin oxide (ITO) is usually selected to form an interdigital electrode by photolithography, ion beam etching, etc., and then a dielectric layer is formed by spray coating, spin coating, etc. The interdigital electrode provides a continuous fringe field, and when an external voltage is applied to the interdigital electrode, a continuous non-uniform electric field is generated.

Zoom optical lens is a core component of cameras, microscopes, telescopes and other optical devices. A traditional zoom optical lens usually achieves zoom by using mechanical components to adjust relative positions of multiple solid lenses, which is large in size and prone to mechanical wear. With the increasing demands for miniaturization and integration of devices, liquid zoom lens has attracted more and more attention of scholars. Specifically, the zoom technology that changes a shape of a liquid surface through electrowetting-on-dielectric (EWOD) or dielectrophoresis (DEP) has been widely studied and applied due to its advantages of no mechanical drive, low power consumption, and easy to achieve integration. The setting of an electrode and a dielectric layer in a lens cavity body is a key step to construct two liquid lenses through EWOD and DEP. Traditional construction methods are difficult to be performed in complex non-planar regions, which limit the shape and service life of the cavity body. Although the performance of liquid lenses has been greatly improved later, there is still not much improvement in their manufacture methods. Traditional manufacture methods of the dielectric layer usually use spin coating, spray coating, and other methods to coat a large area inside a complex cavity body after a main structure of the lens is formed, the process is complex, and the dielectric layer is difficult to adhere in the cavity body having a complex shape for a long service life, so that the diversity of the cavity body is limited. A study has combined the EWOD and DEP to interdigital electrodes, and a liquid lens including the interdigital electrode has high adjustability of focal length, good optical performance, and other advantages. A patent with a publication number of CN114325896A discloses a zoom lens having a radial telescopic arch shaped magnifying structure and its working method, and a similar design is disclosed in the patent. However, most interdigital electrodes are composed of parallel or radial interdigital stripes, which are generally limited to applications on flat surfaces and difficult to achieve on curved surfaces or sidewalls, and the process is cumbersome and the cost is high.

SUMMARY

In order to solve the above shortcomings, the disclosure provides a liquid lens controlled by an interdigital electrode made of two insulated wires. The liquid lens has a simple and flexible construction method, and its preparation process is mature and reliable.

To achieve the above purpose, the disclosure uses the following technical solutions.

A liquid lens controlled by an interdigital electrode made of two insulated wires is provided. A principle of an interdigital electrode of the liquid lens is as follows: the interdigital electrode includes: a substrate and the two insulated wires winded on the substrate; the two insulated wires are not conducted with each other, an end of each of the two insulated wires is taken as a driving electrode, and another end of each of the two insulated wires is suspended. The liquid lens includes: an inner core cavity body, the two insulated wires, a first transparent body, a second transparent body, a first fluid, and a second fluid; the two insulated wires are arranged side by side and longitudinally winded on the inner core cavity body, to thereby form the interdigital electrode on a sidewall of the inner core cavity body; the first transparent body is disposed at an upper end of the inner core cavity body and the second transparent body is disposed at a lower end of the inner core cavity body; a lens cavity is defined among the inner core cavity body, the first transparent body, and the second transparent body; the first fluid and the second fluid are immiscible and disposed in the lens cavity; and the interdigital electrode is configured to drive the first fluid and the second fluid to achieve a zoom function of the liquid lens.

In an embodiment, the liquid lens further includes: sealing rings; and one of the sealing rings is disposed between the inner core cavity body and the first transparent body, and another of the sealing rings is disposed between the inner core cavity body and the second transparent body.

In an embodiment, the liquid lens further includes: a protective sleeve disposed outside the lens cavity.

In an embodiment, a surface of the interdigital electrode is coated with a hydrophobic layer configured to fill a gap between the two insulated wires.

In an embodiment, the inner core cavity body defines grooves, the two insulated wires are winded in the grooves in an alternating manner, and the two insulated wire are adhered to the inner core cavity body through a curing adhesive.

In an embodiment, the lens cavity is in a truncated cone shape or a cylindrical shape.

In an embodiment, a material of the first transparent body glass, and a material of the second transparent body is glass.

In an embodiment, a material of the first transparent body or a material of the second transparent body is an elastic film, a side of the elastic film defines a hole configured to inject a fluid into the lens cavity to change a pressure inside the lens cavity, thereby deforming the elastic film to achieve zooming of the liquid lens.

Compared with the prior art, the disclosure has the following beneficial effects: (1) Two insulated wires which are respectively coated with insulating dielectric layers and are not conducted with each other are closely winded on the substrate in an alternating manner to form the interdigital electrode, thereby overcoming the defect that an interdigital electrode of traditional methods is limited to planar application. (2) On this basis, when the interdigital electrode of the disclosure is applied to the inner core cavity body of the liquid lens, a shape of the inner core cavity body is various and will not be limited. (3) By changing a driving voltage to change a shape of the fluid surface, a focal length of the liquid lens can be adjusted, thereby forming a type of variable focus liquid lens (also referred to as a type of liquid lens with an adjustable focal length) including the flexible electrode. A production process of the liquid lens of the disclosure is flexible and simple, simplifying the production process of traditional liquid lenses based on electrowetting-on-dielectric (EWOD) and dielectrophoresis (DEP).

BRIEF DESCRIPTION OF DRAWINGS

FIG. 3 illustrates a schematic diagram of the liquid lens of the disclosure when it is powered on.

FIG. 4 illustrates a structural schematic diagram of the liquid lens when an inner core cavity body is cylindrical.

DETAILED DESCRIPTION OF EMBODIMENTS

Figure 1:
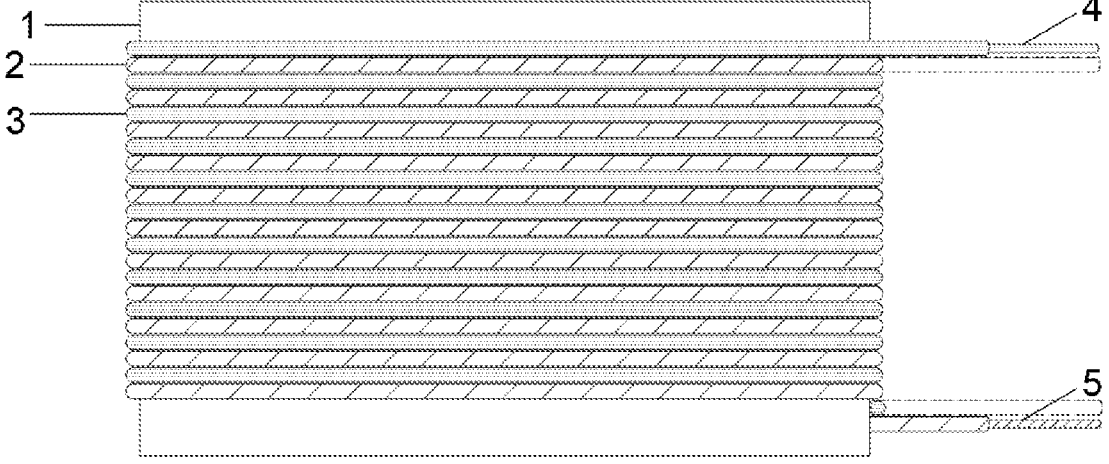
FIG. 1 illustrates a structural schematic diagram of an interdigital electrode of the disclosure.

In order to make it easy to understand the technical solutions, technical features and purposes of the disclosure, the following embodiments are given to further illustrate the disclosure, but the disclosure is not limited to the following embodiment. Elements in the drawings are not necessarily drawn to scale, and the drawings aim to explain principles of the embodiments.

A principle of an interdigital electrode of the disclosure is as follows: two insulated wires which are coated with insulating dielectric layers and are not conducted with each other are closely winded on a substrate in an alternating manner to form a two-dimensional wire wall; and hydrophobic treatment is performed on the two-dimensional wire wall to construct the interdigital electrode. Based on the principle, the interdigital electrode can be further applied to a sidewall of a liquid lens based on EWOD or DEP. The structure of the liquid lens is as follows: two insulated wires are arranged side by side and longitudinally winded on an inner core cavity body. The interdigital electrode configured to provide a driving force along a flowing direction of liquid (i.e., fluids in the liquid lens) is formed on the sidewall of the inner core cavity body. A hydrophobic layer is coated on a surface of the interdigital electrode. A lens cavity is defined among the inner core cavity body, an upper transparent body, and a lower transparent body and has a truncated conical or conical shape. Two fluids which have different refractive indexes and are immiscible are stored in the lens cavity to serve as materials of the liquid lens, and the liquid lens includes sealing rings and a protective sleeve to assist in packaging, so that the three-dimensional liquid lens with a zoom function structure driven by the interdigital electrode on the sidewall is manufactured.

The substrate (e.g., inner core cavity body) of the interdigital electrode can be provided with several tight grooves, and the two insulated wires can be placed in the grooves for winding. The two insulated wires can be adhered to the grooves using a curing adhesive.

The two insulated wires can be placed on the substrate in sequence, odd numbered insulated wires can be connected by welding, and even numbered insulated wires can be connected by welding, thereby avoiding overlapping between the two insulated wires during winding.

In some embodiment, the lens cavity is in a truncated cone shape, a cylindrical shape, or other shapes.

In some embodiments, materials of the first transparent body and the second transparent body are glass, lenses, elastic polymer films, or others. The materials of the first transparent body and the second transparent body can be selected according to different application scenarios, which can be the same or different.

In an embodiment, a material of the first transparent body or a material of the second transparent body is an elastic film, a side of the elastic film defines a hole configured to inject a fluid into the lens cavity through the hole to change a pressure inside the lens cavity, thereby deforming the elastic film to achieve zooming of the liquid lens.

The interdigital electrode constructed based on two insulated wires and the liquid lens can be optimized for application in more real-life scenarios such as mobile phone zoom lenses, autofocus lenses of express station, telescopes, and others.

Embodiment 1

Figure 2:
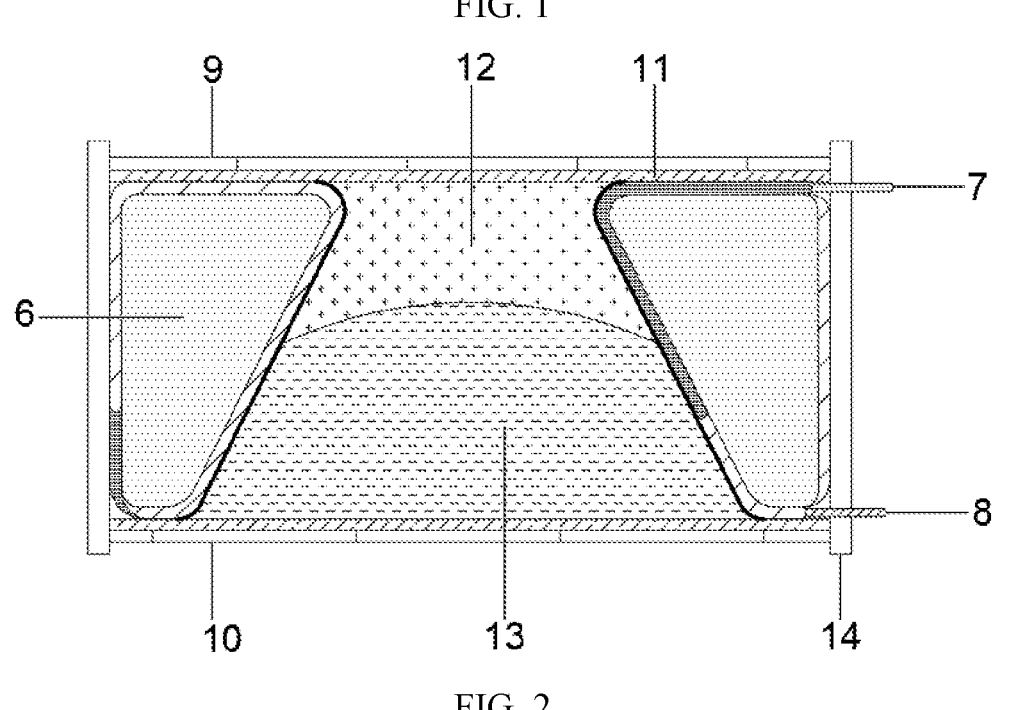
FIG. 2 illustrates a structural schematic diagram of a liquid lens of the disclosure.
Figures 3, 4:
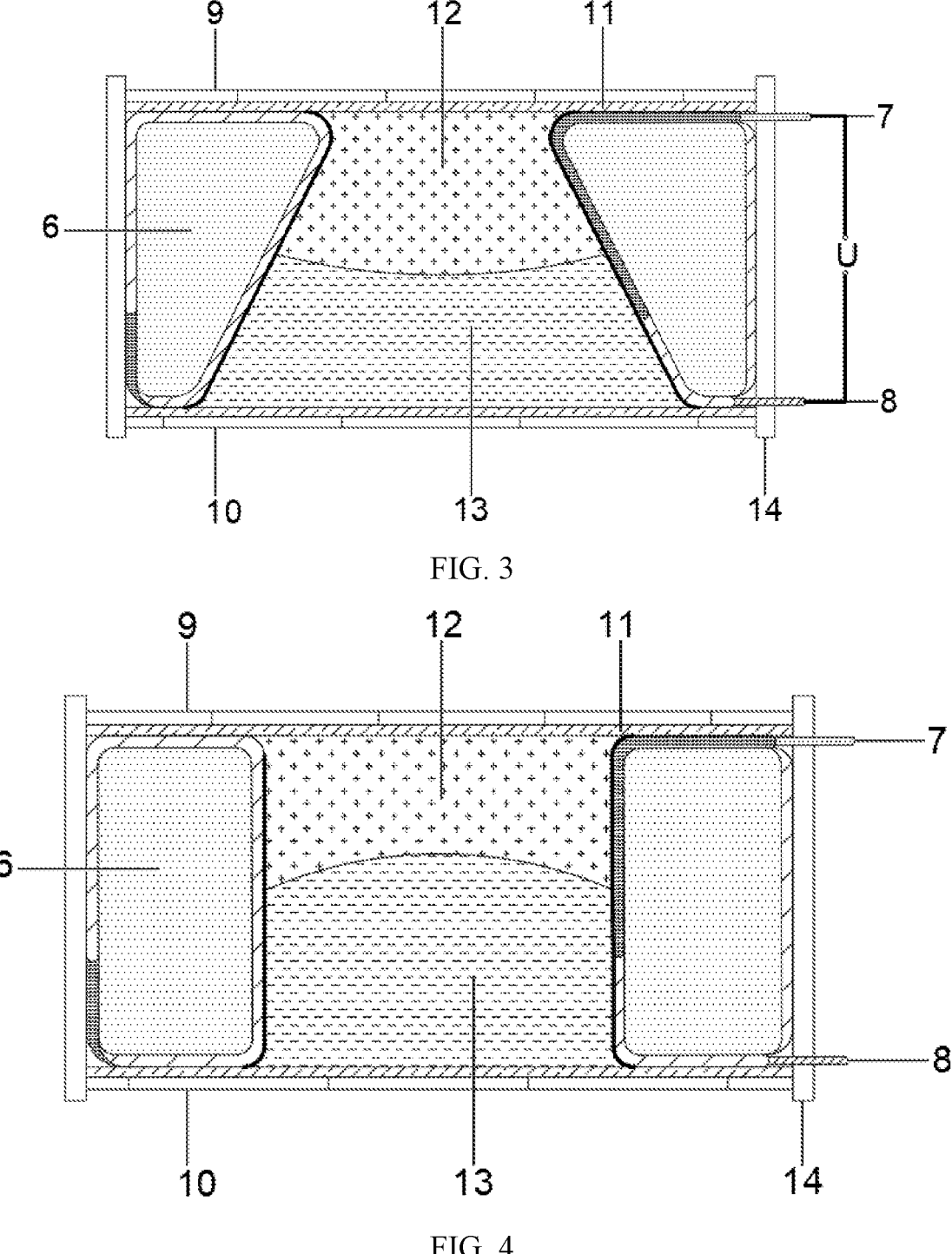

Referring to FIG. 1, FIG. 2, and FIG. 3, an interdigital electrode made of two insulated wires and a liquid lens are provided. The interdigital electrode includes a substrate 1. A preferred material of the substrate 1 is glass. The interdigital electrode further includes a first insulated wire 2 and a second insulated wire 3. The first insulated wire 2 and the second insulated wire 3 are not conducted with each other and are closely winded on the substrate 1 in an alternating manner. A preferred core material for the insulated wires is copper. The core material is coated with a polyester material as insulating dielectric layer. After winding of the insulated wires, an interdigital electrode is formed. TEFLON resin such as polytetrafluoroetylene (PTFE) is applied on a surface of the interdigital electrode, and the PTFE is dried and cured on the surface of the interdigital electrode as a hydrophobic layer. An end of the first insulated wire 2 is taken as a first driving electrode 5, and an end of the second insulated wire 3 is taken as a second driving electrode 4. Another end of the first insulated wire 2 and another end of the second insulated wire 3 are suspended. The interdigital electrode of the liquid lens of the disclosure is constructed based on the above method. The liquid lens mainly includes an inner core cavity body 6 prepared by three-dimensional (3D) printing technology, a lens cavity defined by the inner core cavity body 6 is in a truncated cone shape, and a preferred printing material is polylactic acid (PLA). A third insulated wire 7 and a fourth insulated wire 8 are arranged side by side and longitudinally winded on the inner core cavity body 6. The winding of the insulated wires can be finished by a toroidal winding machine, thereby obtaining an interdigital electrode on a sidewall of the inner core cavity body 6. The interdigital electrode is configured to provide a driving force along a flowing direction of liquid. PTFE is applied on the interdigital electrode as a hydrophobic layer. Upper and lower ends of the inner core cavity body 6 are provided with a first transparent body 9 and a second transparent body 10 respectively. The first transparent body 9 and the second transparent body 10 are preferably flat glass. To increase the sealing performance of the liquid lens, sealing rings 11 are provided to assist the first transparent body 9 and the second transparent body 10 in packaging the inner core cavity body 6; a preferred material for the sealing ring 11 is rubber, and an ultraviolet (UV) curing adhesive is used to fix the two in sequence. A first fluid 12 and a second fluid 13 are injected into a lens cavity. Preferably, the first fluid 12 and the second fluid 13 are two immiscible transparent liquids, such as phenyl silicone oil and ethylene glycol. A protective sleeve 14 is disposed outside the lens cavity, and the protective sleeve 14 is a silicone rubber tube configured to protect the lens cavity. By applying voltage to the two driving electrodes and changing the size of a three-phase contact angle, a shape of the liquid surface can be changed, thereby achieving an adjustable focal length. A range of the focal length of the liquid lens obtained by a magnification method is (−∞, −100.97 mm]∪[104.84 mm, +∞). By increasing the driving voltage, the focal length can be continuously transformed from negative to positive. Measured values of the focal length basically conform to theoretical calculation values. In order to obtain a larger range of the focal length or achieve a smaller focal length, a fluid combination with a larger difference in refractive indexes can be used or a tilt angle of the sidewall can be adjusted. Through experiments and simulations, the image resolution of the liquid lens of the disclosure is 18.62 line-pairs/mm (1p/mm), and the imaging quality of the liquid lens of the disclosure is not inferior to other liquid lenses under the same conditions. In addition, a response time measurement analysis is also performed; the driving time is maintained at 190 milliseconds (ms) when applying voltage, while the relaxation time is kept at 133 ms when power is cut off, and the response time is less than 200 ms, which is better than other types of liquid lenses with the same effect and has higher stability.

Embodiment 2

Figure 5:
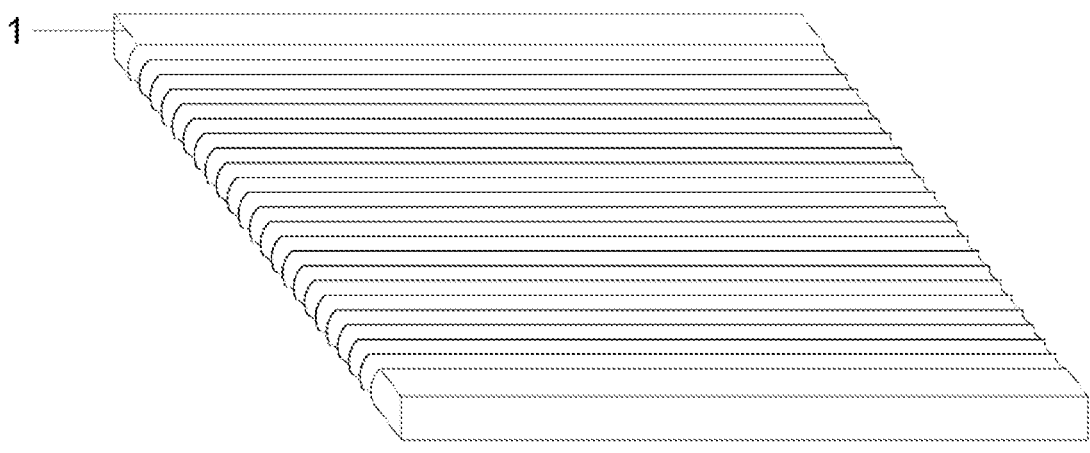
FIG. 5 illustrates a structural schematic diagram of a substrate of the embodiment 2 of the disclosure.
Figure 6:
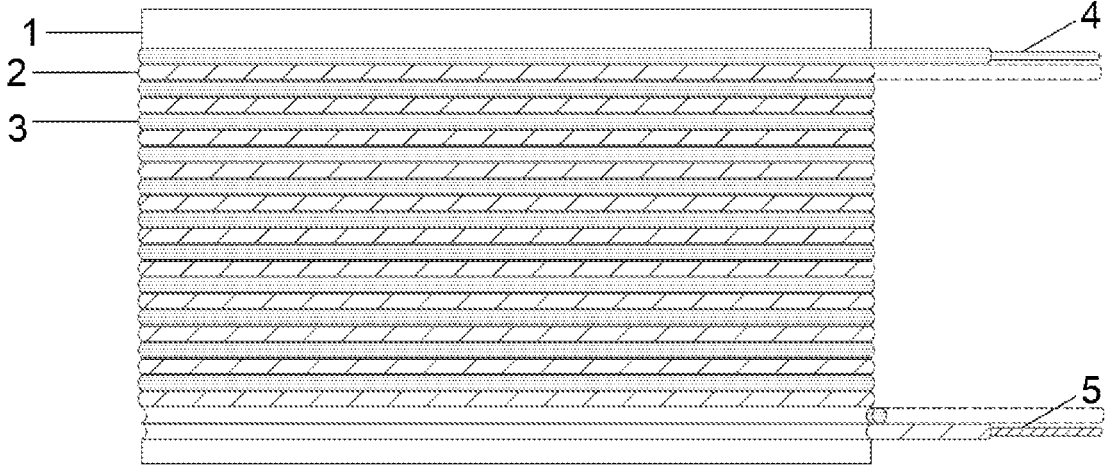
FIG. 6 illustrates a structural schematic diagram of an interdigital electrode in the embodiment 2 of the disclosure.

Referring to FIG. 5 and FIG. 6, an interdigital electrode made of two insulated wires is provided. The interdigital electrode includes a substrate 1 having multiple tightly arranged grooves. The interdigital electrode further includes a first insulated wire 2 and a second insulated wire 3. The first insulated wire 2 and the second insulated wire 3 are not conducted with each other. A preferred core material for insulated wires is copper. The core material is coated with a polyester material as insulating dielectric layer. The first insulated wire 2 and the second insulated wire 3 are closely winded in the grooves in an alternating manner. An UV curing adhesive can be used to adhere the first insulated wire 2 and the second insulated wire 3 to the grooves. After winding of the insulated wires, an interdigital electrode is formed. PTFE is applied on a surface of the interdigital electrode, and the PTFE is dried and cured on the surface of the interdigital electrode as a hydrophobic layer. An end of the first insulated wire 2 is taken as a first driving electrode 5, and an end of the second insulated wire 3 is taken as a second driving electrode 4. Another end of the first insulated wire 2 and another end of the second insulated wire 3 are suspended. The interdigital electrode of the disclosure uses one-dimensional insulated wires to replace the traditional construction structures of electrodes and dielectric layers on the three-dimensional surface in traditional interdigital electrodes based on EWOD and DEP. The interdigital electrode of the disclosure is flexible, making it convenient to form three-dimensional cavities and suitable for more complex device structures.

Embodiment 3

Figure 7:
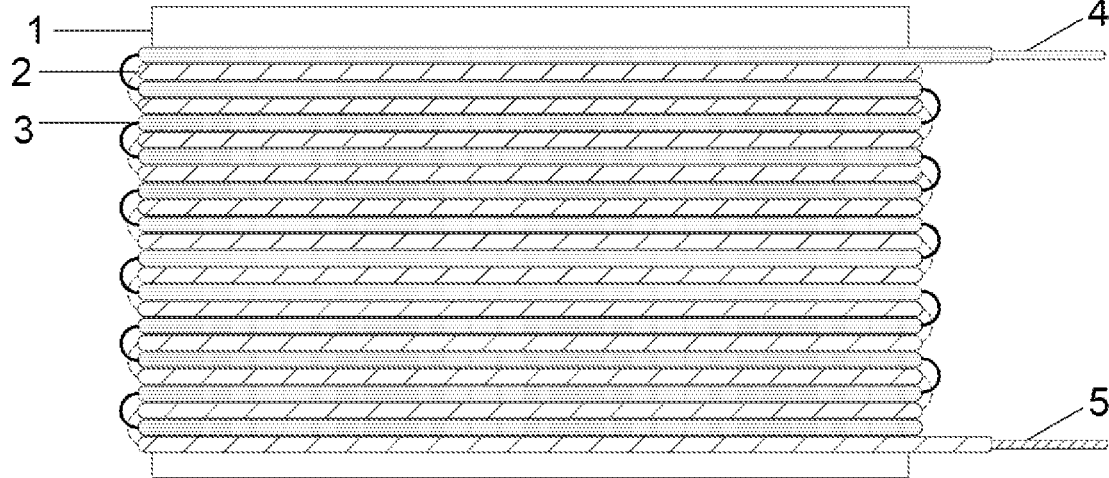
FIG. 7 illustrates a structural schematic diagram of the liquid lens in the embodiment 3 of the disclosure.

Referring to FIG. 7, an interdigital electrode made of two insulated wires is provided. The interdigital electrode includes a substrate 1 and multiple insulated wires which are not conducted with each other. A preferred core material for the insulated wires is copper. The core material is coated with a polyester material as insulating dielectric layer. An UV curing adhesive is used to adhere the insulated wires to the substrate 1. Odd numbered insulated wires can be connected by welding to form a first insulated wire 2, and even numbered insulated wires can be connected by welding to form a second insulated wire 3, thereby avoiding overlapping between the two insulated wires during winding. After the welding, the interdigital electrode is formed. PTFE is applied on a surface of the interdigital electrode, and the PTFE is dried and cured on the surface of the interdigital electrode as a hydrophobic layer. An end of the first insulated wire 2 is taken as a first driving electrode 5, and an end of the second insulated wire 3 is taken as a second driving electrode 4. Another end of the first insulated wire 2 and another end of the second insulated wire 3 are hanged in air. The interdigital electrode can generate continuous edge fields and controllable non-uniform electric fields, and the interdigital electrode are flexible, which provides a new construction method for three-dimensional dimmable devices.

Embodiment 4

Figures 8, 9:
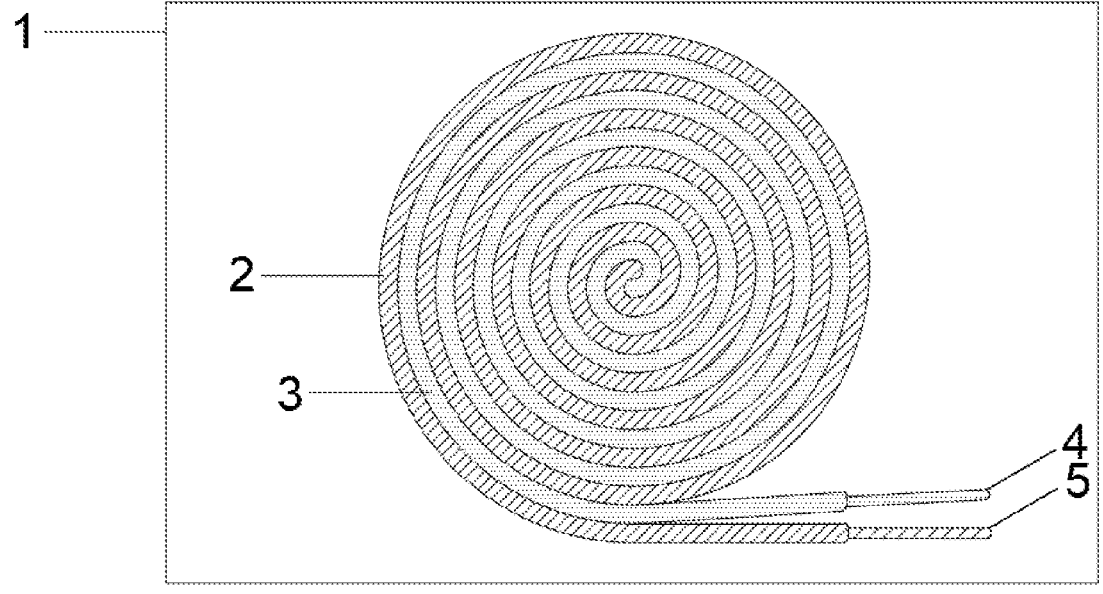
FIG. 8 illustrates a structural schematic diagram of the liquid lens in the embodiment 4 of the disclosure.
FIG. 9 illustrates a structural schematic diagram of the liquid lens in the embodiment 5 of the disclosure.

Referring to FIG. 8, an interdigital electrode made of two insulated wires is provided. The interdigital electrode includes a substrate 1, a first insulated wire 2, and a second insulated wire 3. The first insulated wire 2 and the second insulated wire 3 are not conducted with each other. The first insulated wire 2 and the second insulated wire 3 are closely arranged on the substrate 1 in a shape similar to a disc mosquito repellent incense. An UV curing adhesive is used to adhere the insulated wires to the substrate 1. After the insulated wires are arranged, the interdigital electrode is formed. PTFE is applied on a surface of the interdigital electrode, and the PTFE is dried and cured on the surface of the interdigital electrode as a hydrophobic layer. An end of the first insulated wire 2 is taken as a first driving electrode 5, and an end of the second insulated wire 3 is taken as a second driving electrode 4. Another end of the first insulated wire 2 and another end of the second insulated wire 3 are hanged in air. The interdigital electrode can generate continuous edge fields and controllable non-uniform electric fields, and the interdigital electrode are flexible, which provides a new construction method for three-dimensional dimmable devices.

Embodiment 5

Referring to FIG. 9, an interdigital electrode made of two insulated wires and a liquid lens are provided. The liquid lens mainly includes an inner core cavity body 6 prepared by 3D printing technology, the inner core cavity body 6 is in a truncated cone shape, and a preferred printing material is PLA. A third insulated wire 7 and a fourth insulated wire 8 are arranged side by side and longitudinally winded on the inner core cavity body 6. The winding of the insulated wires can be finished by a toroidal winding machine, thereby obtaining an interdigital electrode on a sidewall of the inner core cavity body 6. The interdigital electrode is configured to provide a driving force along a flowing direction of liquid. PTFE is applied on the interdigital electrode as a hydrophobic layer. Upper and lower ends of the inner core cavity body 6 are provided with a first transparent body 9 and a second transparent body 10 respectively. The first transparent body 9 and the second transparent body 10 are preferably flat glass. To increase the sealing performance of the liquid lens, sealing rings 11 are provided to assist the first transparent body 9 and the second transparent body 10 in packaging the inner core cavity body 6; a preferred material for the sealing ring 11 is rubber, and an UV curing adhesive is used to fix the two transparent bodies in sequence. A first fluid 12 and a second fluid 13 are injected into a lens cavity. Preferably, the first fluid 12 and the second fluid 13 are two immiscible transparent liquids, such as phenyl silicone oil and ethylene glycol. A protective sleeve 14 is disposed outside the lens cavity, and the protective sleeve 14 is a silicone rubber tube configured to protect the lens cavity. Furthermore, a side of the sealing ring 11 defines a hole configured to inject a fluid into the lens cavity to change a pressure inside the lens cavity, thereby deforming the elastic film to achieve zooming of the liquid lens under the pressure. By injecting the liquid, the focal length can be adjusted to the ideal expectation first. After that, a voltage is further applied to the two driving electrodes. Under the action of EWOD or DEP, the size of the three-phase contact angle is adjusted slightly to change the shape of the liquid surface, which is conducive to improving aberration. The two methods achieve adjustments of focal length.

The above specific implementation methods are used to explain and illustrate the disclosure, rather than to limit the disclosure. Anyone can make various changes and variations under the inspiration of the disclosure. Any modifications, equivalent substitutions, improvements, and others made within the spirit and principles of the disclosure should be included within the scope of the claims of the disclosure.

What is claimed is:

1. A liquid lens controlled by an interdigital electrode made of two insulated wires, wherein the liquid lens comprises: an inner core cavity body, the two insulated wires, a first transparent body, a second transparent body, a first fluid, and a second fluid; the two insulated wires are arranged side by side and longitudinally winded on the inner core cavity body, to thereby form the interdigital electrode on a sidewall of the inner core cavity body; the first transparent body is disposed at an upper end of the inner core cavity body and the second transparent body is disposed at a lower end of the inner core cavity body; a lens cavity is defined among the inner core cavity body, the first transparent body, and the second transparent body; the first fluid and the second fluid are immiscible and disposed in the lens cavity; and the interdigital electrode is configured to drive the first fluid and the second fluid to achieve a zoom function of the liquid lens.

2. The liquid lens as claimed in claim 1, wherein the liquid lens further comprises: sealing rings; and one of the sealing rings is disposed between the inner core cavity body and the first transparent body, and another of the sealing rings is disposed between the inner core cavity body and the second transparent body.

3. The liquid lens as claimed in claim 1, wherein the liquid lens further comprises: a protective sleeve disposed outside the lens cavity.

4. The liquid lens as claimed in claim 1, wherein a surface of the interdigital electrode is coated with a hydrophobic layer configured to fill a gap between the two insulated wires.

5. The liquid lens as claimed in claim 1, wherein the inner core cavity body defines grooves, the two insulated wires are winded in the grooves in an alternating manner, and the two insulated wire are adhered to the inner core cavity body through a curing adhesive.

6. The liquid lens as claimed in claim 1, wherein the lens cavity is in a truncated cone shape or a cylindrical shape.

7. The liquid lens as claimed in claim 1, wherein a material of the first transparent body is glass, and a material of the second transparent body is glass.

8. The liquid lens as claimed in claim 1, wherein a material of the first transparent body or a material of the second transparent body is an elastic film, a side of the elastic film defines a hole configured to inject a fluid into the lens cavity to change a pressure inside the lens cavity, thereby deforming the elastic film to achieve zooming of the liquid lens.

* * * * *